United States Patent
Weibel

[15] 3,699,375
[45] Oct. 17, 1972

[54] IMAGE DETECTOR INCLUDING SENSOR MATRIX OF FIELD EFFECT ELEMENTS

[72] Inventor: Gerhard E. Weibel, Deerfield, Ill.

[73] Assignee: Zenith Radio Corporation, Chicago, Ill.

[22] Filed: Sept. 27, 1971

[21] Appl. No.: 184,134

[52] U.S. Cl..............313/95, 313/65 AB, 313/68 R, 313/98, 315/155, 315/158, 317/235 A, 340/166 R
[51] Int. Cl...........................H01j 1/54, H01j 31/48
[58] Field of Search................313/94–96, 65 R, 313/65 AB, 66, 67, 68 R, 98; 315/149, 155, 158; 340/166 R; 317/235 A

[56] References Cited

UNITED STATES PATENTS

3,201,630   8/1965   Orthuber et al.............313/95
3,535,599   10/1970  Deak..................313/65 AB X
3,603,731   9/1971   Weimer............315/169 TV X

Primary Examiner—Roy Lake
Assistant Examiner—Siegfried H. Grimm
Attorney—Peter J. Sgarbossa et al.

[57] ABSTRACT

A distribution of charges is accumulated over a leaky dielectric layer in response to electrons from a microchannel plate, which amplifies the output of a photocathode layer stimulated by optical image information. Each respective element of an array of field-effect elements, coextensive with the charged dielectric and adjacent to the surface of the dielectric opposite the microchannel plate, is differently modulated in conductivity by the local field due to the local charge on the portion of the dielectric adjacent the respective element. Readout by periodic scanning of the level of conductivity of each such element results in a modulated output signal suitable for the reproduction of the optical image information in amplified form.

7 Claims, 10 Drawing Figures

Inventor
Gerhard E. Weibel

Inventor
Gerhard E. Weibel

Inventor
Gerhard E. Weibel

3,699,375

IMAGE DETECTOR INCLUDING SENSOR MATRIX OF FIELD EFFECT ELEMENTS

BACKGROUND OF THE INVENTION

The present invention relates to image detector devices and systems, and particularly to devices for image detection utilizing a matrix of field effect elements and a microchannel plate to derive signals representative of image information.

Much effort has been devoted in the prior art to improvement of conventional image detection devices such as the image orthicon and vidicon, with various attempts at solid-state arrangements, for example, arrays of photodetectors. However, these have usually been found to be disadvantageous in various respects, especially in sensitivity, resolution, gain, and also in complexity of construction. Moreover, such disadvantages are often coupled with the need for a quite complex readout arrangement requiring many separate leads and a multiplicity of switching means, or the need for readout by a scanning electron beam.

Accordingly, it is an object of the invention to provide an improved device for detection and amplification of image information.

It is a further object of the invention to provide such an improved device having great sensitivity for operation at very low light levels, high resolution and high gain.

It is yet a further object of the invention to provide such a device in a simple uncomplicated construction susceptible of rapid fabrication by thin-film techniques and having a simple readout arrangement.

SUMMARY OF THE INVENTION

In accordance with the invention, a device for detecting image information comprises a cathode layer responsive to the image information to emit electrons, which electron emission has an intensity distribution over the layer representative of the image information. Also provided is a channel multiplier plate disposed in spaced relationship to the cathode layer and accepting the electron emission distribution for amplification and transmission, as well as an array of field effect elements disposed in spaced relationship to the channel plate and having an insulating layer receiving the amplified electron distribution from the channel plate with the insulating surface of the array accumulating a charge distribution pattern in response to the electron emission distribution. This charge pattern exerts an electric field of locally varying strength, and the conductivity of the individual elements of the array vary in accordance with the locally varying field strength and thereby in a manner representative of said image information.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
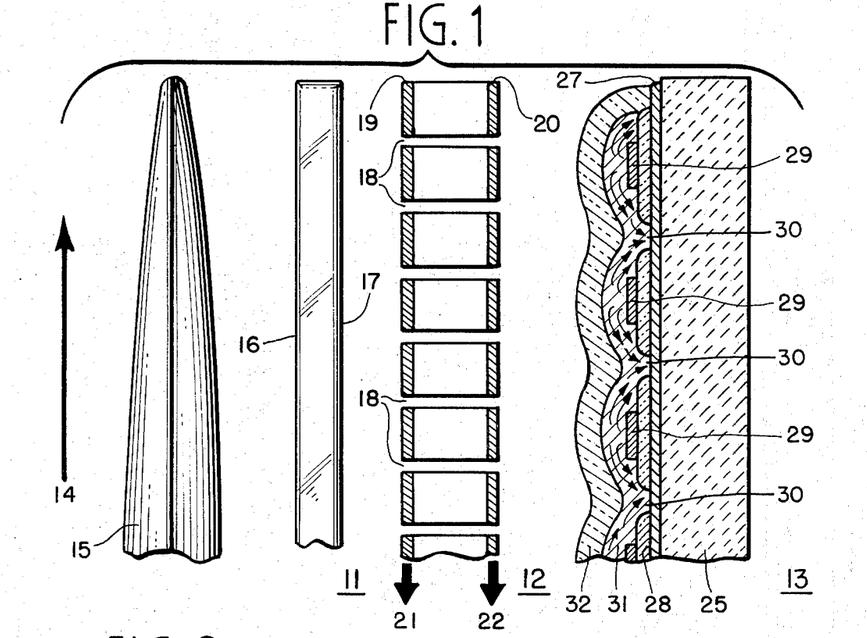
FIG. 1 is a cross-sectional, enlarged, fragmentary view of an embodiment of the image detector device according to the invention.

The image converter of FIG. 1 is an assembly including a photocathode plate 11, an electron multiplier, specifically a channel multiplier plate 12, and a sensor matrix 13, all mounted in a fixed close parallel and coextensive relationship within an evacuated container transparent to light (not shown). The photocathode plate is similar to that typically used in the art in such image converter or intensifier applications; in response to the focusing of a light image of object 14 by a projection system, here lens 15, upon its outside surface 16, its inside surface 17 emits photoelectrons whose intensity varies over the surface area in a manner proportional to that of the incident image. The microchannel plate 12 upon which such electrons impinge is also a known structure and is disclosed, by way of illustration, in U.S. Letters Pat. No. 3,341,730, issued in the name of George W. Goodrich et al. on Sept. 12, 1967. As indicated in the drawing, it is an array or stack of parallel-arranged individual channel or tubular elements 18 usually formed of glass and treated to the end that the inner surface of each channel is a secondary emitter with an emission ratio, in response to an input or impacting electron, greater than unity. The channels, after having been arrayed to define a plate of suitable dimension and configuration, are subjected to a heat treatment to fuse the channel elements and form a single unitary multichannel plate. The diameter of the individual channels 18 is usually small compared with their length. It is necessary to apply an operating potential across the plate and for that purpose both the input and output surfaces 19 and 20 are provided with a conductive coating or layer as by painting, vapor deposition, or the like to which terminals 21 and 22 are attached for convenience of applying an operating potential to the plate. Channel plate 12 is so arranged in relation to sensor matrix 13, both as to position and potential level, to achieve proximity focusing of electrons issuing from plate 12 upon it. The emitted electrons thus enter the channels or tubes 18 of the parallel array and produce secondary emissions which are accelerated by the operating potential. An amplification of the electron stream of each channel is effected which is proportional to the amount of light striking the portion of the photocathode 11 adjacent each such channel so that the overall output of the microchannel plate represents an intensified electron image of the object image.

The output of each channel of the multichannel plate impinges on a discrete area of the front surface of sensor matrix 13 of field-effect elements, a multilayer thin-film device fabricated upon a substrate 25 by a series of thin film depositions and photoetching. The construction of the sensor matrix may best be seen first with reference to FIG. 2 perspective views, then by the sectional view of the FIG. 2 matrix found in FIGS. 1 and 2a and which are taken along section line 1—1 and 2a—2a representing orthogonal planes perpendicular to the plane of the substrate 25 of FIG. 2, and in the representative sensor element 26 found in FIG. 2c, a detail view of the area enclosed by dotted lines of FIG. 2. Substrate 25, which of course is also the outside layer of the FIG. 1 device, is preferably of glass and of a thickness sufficient to afford support for the area size which is chosen for the device. Over substrate 25 is an array of equally spaced strips 27 of high conductivity metal conductors typically several thousand Angstroms thick, hereafter referred to as the "vertical" conductors. Over this array is a dielectric film 28 of uniform thickness preferably between 1,500 and 4,000 Angstroms. This dielectric layer provides crossover insulation between the array 27 of vertical conductors and a second similar array 29 which is positioned orthogonally to the first array, hereafter termed the "horizontal" conductors. The thickness of the crossover dielectric 28 will vary in accordance with the particular material chosen, the working voltage of the matrix and the degree of suppression of stray capacitances and conductances needed.

Figures 2, 2A, 2C:
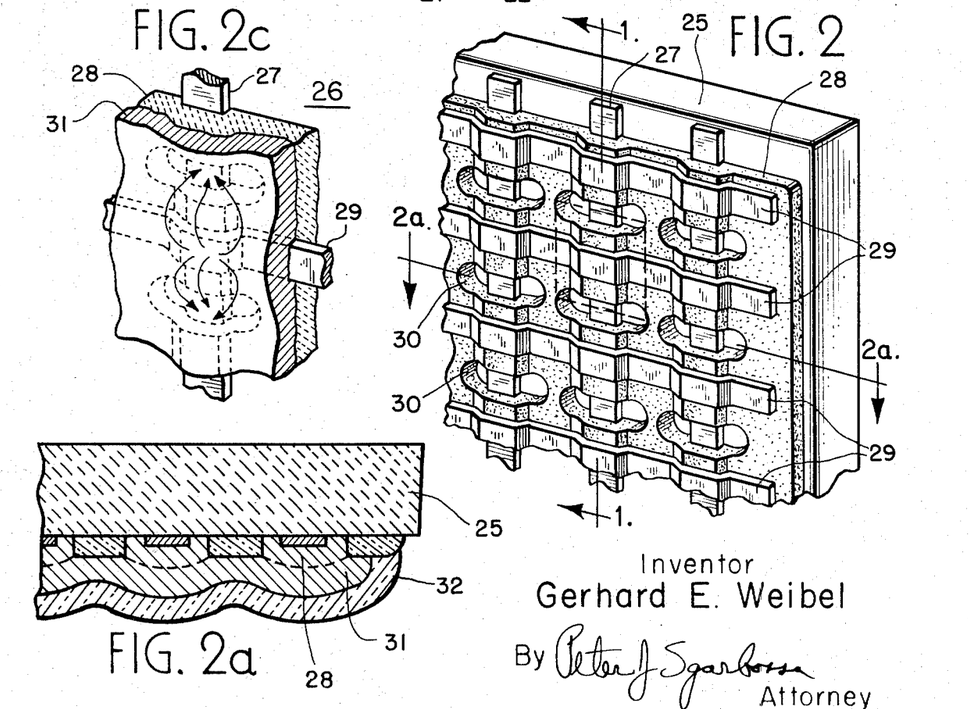
FIG. 2 is a perspective fragmentary view showing construction details of the first few layers of the sensor element array portion of the image detector device of FIG. 1.
FIG. 2a is a fragmentary cross-sectional view of the construction of FIG. 2, taken across plane 2a—2a of FIG. 2, transverse to the array and with all additional layers in place for a complete field-effect element array.
FIG. 2c is a greatly enlarged view showing the construction of the pair of sensor elements at the intersection of planes 2a—2a and 1—1 of FIG. 2.

The dielectric layer contains an array of slots or "windows" 30 exposing a narrow area of vertical conductor midway between adjacent row-column intersections as illustrated in FIG. 2. Such slotting of the dielectric layer may, for example be accomplished by means of photoetching techniques. The area of vertical conductor thus exposed will each form the "drain" electrodes of the field effect sensor element, with "source" electrodes to be supplied by the horizontal conductors; this is seen to best advantage in FIG. 2b. FIGS. 1, 2a and 2c illustrate that over the horizontal conductor array 29 and crossover insulation 28 is a uniform semiconductor film layer 31, and over the semiconductor a uniform layer 32 of a leaky dielectric film (neither of which are illustrated in FIG. 2).

The semiconductor 31 is a depletion $n$-type, for example, II-VI compounds such as CdS or CdSe, or GaAs, of thickness of about 1,000 A. As shown especially in the illustration of matrix 13 in FIG. 1, the semiconductor is made to fill the slots or windows 30 in the cross-over insulation 28, thus coming into contact with the vertical conductor 27 lying at the bottom of each such window. In order to facilitate the read-out of image information in accordance with the scheme to be described later, it is preferred that such contact with the vertical conductors 27 by the semi-conductor 31 be made a rectifying contact, a result which may be readily achieved by the choice of thin film processing and materials techniques. On the other hand, the semiconductor contact with the horizontal conductors 29 should be a merely ohmic contact. This also may be reversed, with the contact at the vertical conductor ohmic, and the contact at the horizontal conductor rectifying. The deposition of the semiconductor film 31 may include evaporation or CVD of the basic material, followed by post treatment such as may be required to obtain the necessary mobility (recrystallization may be necessary to achieve a suitable grain size and thus mobility in certain materials). The considerations governing the choice of other characteristics of this layer such as resistance and electron mobility are further developed below in connection with FIG. 2a.

The leaky dielectric layer 32 is the final layer of the sensor matrix 13; it must possess a controlled degree of conductivity, with a certain dielectric discharge time constant $\Delta t$, so that it may collect over an integration time period the electrons impinging on it from each of the channels 18 of the multichannel plate 12. Such a leaky dielectric film may be, for example, a silicon monoxide film of thickness near 1,000 A; other Characteristics, in particular the value of the constant, are evaluated in connection with FIG. 2a.

In this manner the matrix 13 is obtained of sensor elements of the form illustrated by the area of FIG. 2 within the dotted lines and in greater detail in FIG. 2c, each of which is located at the intersection of a general vertical conductor column $m$ and a general horizontal conductor row $n$. Each such sensor element or intersection includes a pair of connecting channels of semiconductor between column and row conductors, resulting in a pair of field-effect devices in parallel to each row-column intersection. The two window areas on the vertical or column conductor 27 in FIG. 2c are the respective drains of the device, while each half of the horizontal row conductor 29 at the intersection may be considered the respective source electrode for each field effect device. The flow of electrons in the two symmetrical devices of each intersection is indicated by the curved arrowed lines.

Figure 2B:
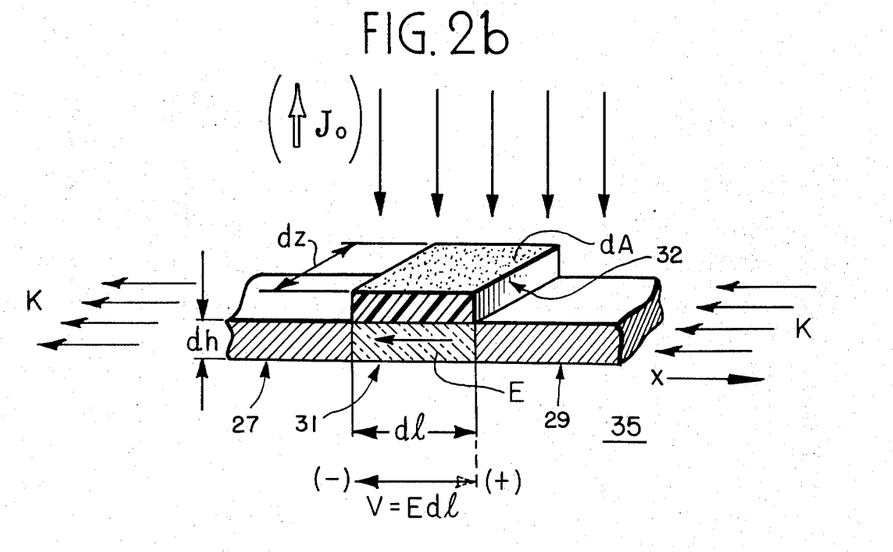
FIG. 2b is a schematic diagram of an individual field effect element showing its manner of operation.

The operation of each of these elemental field-effect devices and thus of the sensor matrix itself may be understood to better advantage by reference to FIG. 2b illustrating in schematic form the elemental device now denominated 35. Facing the microchannel plate is a surface element $dA = dldz$ collecting electrons impinging on the element with some current density $J_o$ for a period of time $t$. This surface element $dA$ is an elemental part of the dielectric 32 deposited on top of the semiconductor 31 and the metal electrodes 27 and 29 make ohmic contact with one end of the semiconductor film, the other being a rectifying contact, with dimensions which we may characterize as $dl$ and $dz$. A voltage is applied between these metal electrodes to cause a conduction current to flow in $x$-direction with current surface density K (amps/cm width of the film). The charge accumulated on the collecting surface is:

$$dQ\text{surf} = -J_o \Delta t \, dldz \quad (1)$$

For a thin dielectric film all the field-lines set up by surface charges will end at the semiconductor surface (or within a small surface layer of the semiconductor). That is, free charges are set up at the semiconductor surface and a dipole layer is formed. The $n$-type semiconductor film has a certain electron density $n_o$ in the absence of the field produced by charges on the dielectric. As the charge $dQ_{surf}$ is set up, $-dQ_{semicond.}$ is induced (image charge of opposite sign).

The semiconductor film, in the absence of an external electric field, is charge-compensated (number of electrons $n_o$ neutralized by equal number of positively ionized, immobile donors - doners — neglecting here, for simplicity, minority carriers). As the external field is applied through $dQ_{surf}$, $(-dQ_{semicond.})$ must be produced by reducing the number of free carriers, that is, electrons, and thereby creating a surplus of positive charges due to the presence of the ionized donors (remaining constant in density throughout — this again neglects minority carriers and effects due to strong band-bending, such as inversion). Therefore:

$$dQ_{semicond.} = -dQ_{surf.} = +J_o \Delta t \, dldz \quad (2)$$

However:

$$dQ_{semicond.} = -e\Delta n \, dldzdh \quad (3)$$

where $e$ = absolute value of electronic charge, or $1.6 \times 10^{-19}$ clb. and $(-\Delta n)$ = change in electron density.

The current $di$ flowing in $+i$ x direction, due to the applied voltage V ($E$ = electric field strength in $x$-direction) and without surface charges on the dielectric, is:

$$di = en_o \, dhdz \cdot E \mu \quad (4)$$

where $dh$ = thickness of semiconductor film,
$E = E_x$ electric field; $E_x < 0$
$n_o$ = electron density in absence of surface charges,
$\mu$ = electron mobility.

Note that $E = E_x$ is negative, producing a current flow in the negative $x$-direction, that is, from right to left.

The sheet current density, that is, the current in the thickness $dh$ of the semiconductor film per unit width of film (amperes/cm width) is, from Eq. (4):

$$K h d_o = di/dz = en_o dh \cdot E \mu \quad (5)$$

and the change of sheet current density produced by the change in electron density is:

$$\Delta K = +e\mu n dh \cdot E \mu \quad (6)$$

Note that we deal with electrons as free carriers so that $\mu$ is the electron mobility and not the hole mobility. We have an $n$-type channel, depletion type field effective device.

The situation encountered here is different from the usual field-effect transistor inasmuch as there is no unipotential gate electrode opposite the semiconductor film, but only a free dielectric surface 32 accumulating impinging electrons. The potential distribution is linear in the $x$-direction; therefore, there are no pinch-off effects or saturation characteristics as found in unipotential gate devices. All that occurs is a uniform modulation of carrier concentration "across the channel," and therefore a simple modulation of the channel conductivity. From Eq. (2) and Eq. (3) we obtain:

$$\Delta n = -J_o \Delta t / edh \quad (7)$$

and substituting into Eq. (6):

$$\Delta K = -J_o \Delta t E \mu \quad (8)$$

Recall that $\Delta t$ is the time during which electronic charge is being accumulated on the surface by collecting the electron current with density $J_o$; it will hereafter be referred to as the integration time constant.

Exemplary numerical values for the above quantities have been determined including, as we have seen, thickness of the semiconductor and dielectric films 31 and 32, their resistivities, and other characteristics. Now an electron mobility $\mu$ of 100 cm$^2$/V$_{sec}$ is reasonably easy to obtain if the suggested II—VI compound semiconductors such as CdS or CdSe are used; with a suitably prepared film of GaAs (poly-crystalline with grain size of the order of 1 $\mu$m) $\mu \sim 1,000$ to 5,000 cm$^2$/V$_{sec}$ may be expected. Also an electric field strength E of $10^4$ V/cm is comparable to those for which FET's are currently being designed.

Then taking $\Delta t = 1$ sec,
and $\mu = 100$ cm$^2$/V$_{sec}$ and
$E = 10^4$ V/cm (or 1 V over a gap of 1 $\mu$m);
we obtain:

$$\left|\frac{\Delta K}{J_o}\right| = 10^6 \text{ cm.} \quad (9)$$

The semiconductor film thickness dh is preferably, as has been mentioned, 1,000 A = $10^{-5}$ cm; this is thick enough to allow attainment of reasonable values of mobility $\mu$ (because surface scattering is no longer dominant, and because reasonable grain-sizes can be achieved during deposition and/or recrystallization of the film) yet small enough to allow us to produce fairly large conductivity changes without having to use extremely low carrier concentrations.

An exemplary value for the conductivity modulation produced by $J_o \Delta t$ ($10^{-8}$ amps/cm$^2$ for 1 sec.) is as follows:

$$G_m/G_o = 0.01 \quad (10)$$

where $G_o$ = conductivity without electrons present on the insulator, and $G_m$ = conductivity when electrons have been accumulated on the insulator. Since:

$$G_o = \frac{K_o dz}{V} = \frac{K_o dz}{|Edl|} = \frac{1}{R_o} \quad (11)$$

and:

$$G_m = \frac{K_o + \Delta K}{E} \frac{dz}{dl} = \frac{1}{R_m} \quad (12)$$

we obtain from Eq's. (10), (11) and (12):

$$\frac{|\Delta K|}{K_o} = 0.99 \quad (13)$$

Since we have from Eq's. (5) and (6):

$$K_o = en_o dh \cdot E\mu \quad (14)$$
$$K = e\Delta n dh \cdot E\mu \quad (15)$$

thus we have:

$$\frac{|\Delta K|}{K_o} = \frac{\Delta n}{n_o} = 0.99 \quad (16)$$

or:

$$n_o = \frac{|\Delta n|}{0.99} = 1.01|\Delta n| \quad (17)$$

We have for $\Delta n$, from Eq. (7):

$$|\Delta n| = \frac{J_o \Delta t}{edh} = \frac{10^{-8} \times 1}{1.6 \times 10^{-19} \times 10^{-5}}$$

where as before: $J_o = 10^{-8}$ amps/cm.$^2$ $$\Delta t = 1 \text{ sec.}$$
$$e = 1.6 \times 10^{-19} \, clb.$$
$$dh = 10^{-5} \text{ cm.}$$

Thus:
$$|\Delta n| = 6 \times 10^{15} \text{ cm.}^{-3} \quad (18)$$
or: $\quad n_o \cong |\Delta n| \cong 6 \times 10^{15} \text{ cm}^{-3} \quad (19)$ This carrier density is of convenient experimental magnitude and can be reasonably well controlled in preparation.

The conductivity of the semiconductor material 31 in the absence of electrons on the dielectric film 32 is:

$$\sigma_o = e n_o \mu \quad (20)$$

Using numerical values as above, we obtain:

$$\sigma_o = 1.6 \times 10^{-19} \times 6 \times 10^{15} \times 100 = 10^{-1} \, (\Omega \text{ cm})^{-1} \quad (21)$$

or:

$$\rho_o = 10 \, \Omega \text{ cm} \quad (22)$$

where $\rho_o$ = unmodulated resistivity.
The sheet resistance in ohms per square is:

$$R_\square, o \; 732 \; \rho/dh = 10/10^{-5} = 10^6 \text{ ohms per square}$$

or $$R_\square, o = 1 \text{M} \, \Omega \text{ per square} \quad (23)$$

This value is still reasonably low for slow readout devices. If necessary one can, of course, lower the resistance by heavier doping; however, this would reduce the modulation ration $G_m/G_o = R_o/R_m$. On the other hand, a smaller ratio may be perfectly all right for detection purposes and the lower device impedance (say, 10 to 100 K $\Omega$ per square) might be more important.

As has already been seen, the dielectric film 32 must be a leaky storage capacitor, since we do not want to store electrons indefinitely on its surface, and a dielectric time constant $\Delta t$ of 1 second is desired. Time constant is determined by:

$$\Delta t = R^* \, C^* \quad (24)$$

where $R^*$ = *leakage resistance per unit of dielectric film, that is, per cm²*, $C^*$ = *capacitance per cm²* of dielectric film (if there were metal layers below the film and on the top surface). The capacitance per unit area depends on the dielectric constant and the thickness of the film. Since silicon monoxide films, with a thickness of several thousand Angstroms, yield typically capacitance values of 500 to 100 pF per mm², the film dielectric is preferably fabricated from such material; it has a thickness near 1,000 A and a capacitance of $$C^* = 200 \text{ pF/mm}^2 = 2 \times 10^{-8} \text{ F/cm}^2 \quad (25)$$

Therefore, the leakage resistance per unit area becomes:

$$R^* = \frac{1}{C^*} = \frac{1}{2 \times 10^{-8}} = 5 \times 10^7 \Omega/\text{cm.}^2$$

$$R^* = 50 M\Omega/\text{cm.}^2 \quad (26)$$

This convenient value is seen to be characteristic of a high resistivity film whose presence would not affect conduction in the semiconductor film by shunt-loading, since the sheet resistivity of this film is of the order of $5 \times 10^{11}$ M $\Omega$ per square.

Figure 3A:
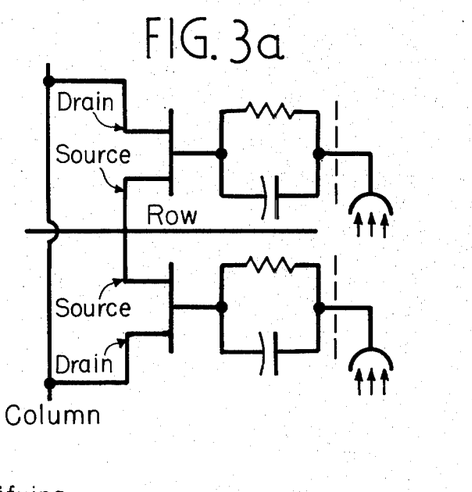
FIG. 3a is a diagram of the equivalent circuit of the field-effect element pair of FIG. 2c.

The equivalent circuit of each of the elemental field-effect devices 35, or each half of a sensor element 26 exemplified by FIG. 2c is shown in FIG. 3a. The semiconductor film with source and drain contact is indicated as is customary for a field-effect transistor; however, the usual gate electrode symbol is replaced here by a broken line parallel to the semiconductor channel to remind one of the fact that there is no unipotential gate surface present; only the leaky dielectric layer whose free surface is collecting the impinging electrons from the channel plate.

The RC- element between the semiconductor film and the dielectric surface is intended to represent the time constant $\Delta t$ of the leaky dielectric. For clarity reasons, the electron collecting function of the surface is emphasized by showing an electron collector electrode. It should be remembered that in reality there is a distributed network of RC-elements and electron collectors along the length of the semiconductor channel between source and drain.

Figure 3B:
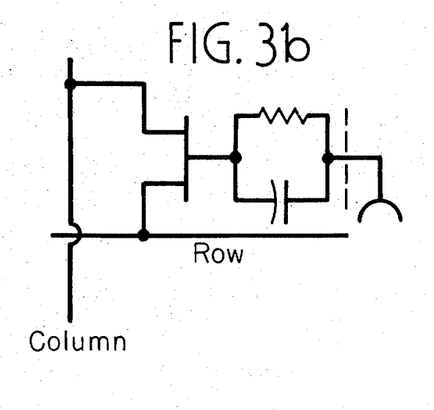
FIG. 3b is a diagram of a more simplified equivalent circuit of the field-effect element pair of FIG. 2c.

The two symmetrical field-effect devices at each intersection of a row and column can be replaced, of course, by one equivalent field-effect sensor at one-half the impedance level, the equivalent circuit of which is shown in FIG. 3b.

The calculation of the sensor resistivity has, of course, to include the consideration of device geometry. In the basic calculations presented in connection with FIG. 2a, one-dimensional current flow was assumed; from FIG. 2b it is apparent that one has to recognize the two-dimensional pattern of current flow. With dimensional proportions roughly as illustrated, an aspect ratio of about 2:1 (width to length) of an equivalent one-dimensional current flow sheet is provided. Since two field-effect devices are connected in parallel, $R_{equ} \cong 1/4 R_\square$, where $R_\square$ is the sheet resistance of the semiconductor film (ohms/square).

The dielectric layer portion 32 of each sensor element 26 accumulates charge varying in accordance with the electron stream intensity from those channels of the microchannel plate 12 in registration with that sensor, as we have seen, so that a charge pattern across the dielectric layer 32 exists which varies locally in accordance with the local variations in light intensity of the image focused on the photocathode plate 11. In turn, the local charge upon the dielectric portion of each sensor modulates the electrical conductivity of the adjacent semiconductor film, so that it also varies across the entire area in accordance with the image intensity information. In order to read out this conductivity distribution, representative of the image information, the system schematically illustrated in FIG. 4 has been devised. Its theory of operation may be more conveniently understood by assuming that the sensor matrix 13 has M columns and N rows.

Figure 4:
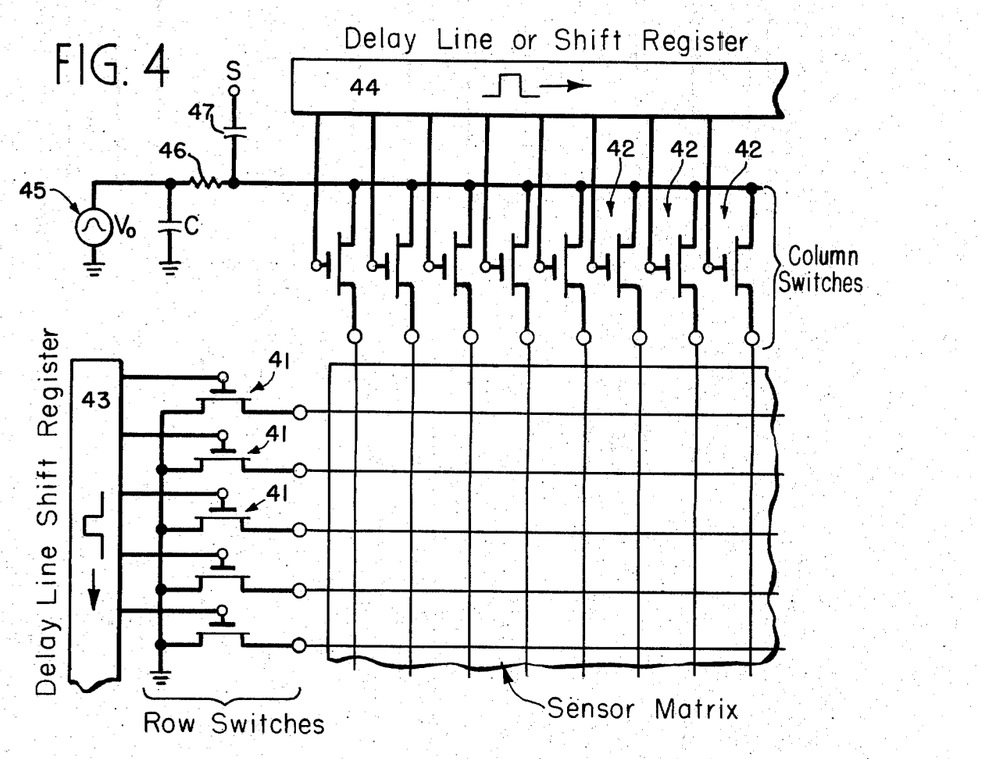
FIG. 4 is a schematic diagram of a complete imaging system reading out each element of the detector device and developing a video signal representative of the image information thereby derived.

Then there are $MN$ intersections or sensor elements 26, but only $(M + N)$ accessible terminals. Complete image information would be obtained if one could determine, from measurements at the $(M + N)$ terminals, all MN resistances $R_{m,n}$ at intersections between column $m$ and row $n$.

In general, one can choose $(M + N - 1)$ independent voltages at the available terminals and measure $(M + N - 1)$ independent currents. Since we assume that the unknown resistances $R_{m,n}$ (the resistance of the sensor elements at intersection $M,N$,) are linear, we can normalize the variables by dividing them through one of the $(M + N - 1)$ voltages (results are independent of scaling all variables by a factor $\alpha$). In this way we obtain $(M + N - 2)$ voltage ratios and $(M + N - 1)$ conductances (or resistances). Therefore, we obtain $2(M + N) - 3$ measurements for the determination of MN unknown; obviously insufficient data to determine the unknowns for any matrix of interest with large $M$ and $N$.

Therefore one has to make a series of measurements, each one with a different set of voltages $V_1^{(k)}, V_2^{(k)} \ldots V_{M+N}^{(K)}$, where $k$ denotes the number assigned to a particular set of conditions imposed. A particularly simple set of measurement conditions in the following one.

Apply voltage $V_o$ to column $m$, that is, $V_m = V_o$, and voltage $V = o$ (ground), that is, $V_n = o$, to row $n$. Leave all other columns and rows unconnected (open) so that $i_j = o$, except for column $m$ and row $n$. Therefore, also $i_m + i_n = o$. Only one quantity will be measured, namely, $r_{m,n} = V_o/i_m$.

Since we have $M$ columns and $N$ rows, this experiment can be repeated for all combinations of $m = 1, 2, 3, \ldots, M$ and $n = 1, 2, 3, \ldots, N$. Therefore one obtains a set of MW values of $r_{m,n}$ from which one can determine at least in principle the unknown quantities $R_{m,n}$. The method of applying $V_o$ to the various columns and grounding, in sequence, the various rows is, of course, the well-known process of scanning a matrix.

Figure 3C:
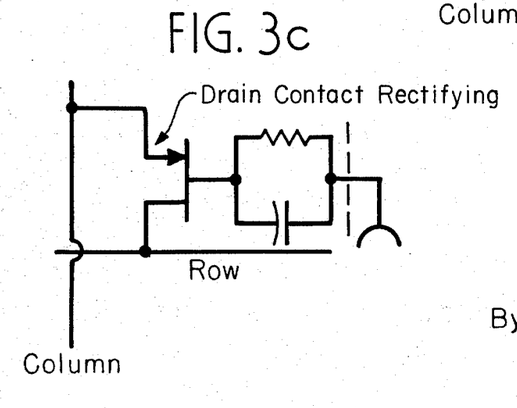
FIG. 3c is the equivalent circuit of the element of FIG. 2c with a modified rectifying junction useful for facilitating readout.

The resistance $r_{m,n}$ is not equal to $R_{m,n}$ because of the existence of other paths connected in parallel to the unknown resistance. This large number of undesired paths in parallel have a tendency to shunt out the sensor element to be measured. The shunting may in fact be so severe as to make the determination (by computation) of the unknown sensor resistance impossible. For this reason, and also for the purpose of avoiding the need for computation of the $R_{m,n}$'s from the $V_{m,n}$'s, the drain contact with the semiconductor film is preferably made a rectifying contact, as earlier described. FIG. 3c illustrates the equivalent circuit, showing the sensor element provided with a rectifying diode in series that allows substantial current to flow only in one direction, say, from drain to source (that is, electrons from source to drain). Now all undesirable paths involve at least one sensor element that is passed through by the current in the direction from row to column, that is, from source to drain (or electrons from drain to source), and therefore will present the blocking resistance to the undesired current. By making the drain contact diode with a large ratio of forward-to-reverse resistance, the influence of these undesirable shunting paths is greatly reduced.

Another more powerful method, if needed, is to provide a field-effect switching transistor in series with each sensor element. The switching transistor is activated by the scanning voltage $V_o$ and connects only the desired sensor to the column and row addressed. However, this approach would require a much more complex structural design of the matrix.

As we have seen, the scanning (or random access) read-out process requires that individual columns and rows be switched on and off (that is, connected to a read-out voltage $V_o$ and ground respectively, or left open). The read-out system of FIG. 4 operates in this manner to make available a video output signal $V_s$ at terminal S representative of the image information gathered by the FIG. 1 device. Arranged along the horizontal and vertical edge of the sensor matrix 13 of the FIG. 1 device are horizontal and vertical arrays of field-effect transistors 41 and 42, having one transistor each for each column and row. The column and row transistor switches 41 and 42 are actuated in a systematic scanning fashion by switching pulses that are propagating along the edges of the matrix by means of electromagnetic or piezoelectric delay lines 43 and 44, respectively for row and column, or alternatively, such switching pluses may also be supplied by shift registers controlled by a master clock. Taps from the delay lines or shift register feed the traveling pulse signal to the gates of the switching transistors 41 and 42 which in turn connect the addressed column to the readout circuit, which consists of a source 45 of electrical potential $V_o$ in series with readout load resistor 46, and the addressed row to ground. Those columns and rows not addressed are not connected because of the very high impedance of the switching transistors 41 and 42 when turned off, i.e., when no pulse is supplied to their gates by the delay lines 43 and 44. A voltage $V_s$ appears across 46 whenever a sensor is being read whose magnitude corresponds to the conductivity of that sensor and is coupled to video output terminal S through coupling capacitor 47.

Figure 4A:
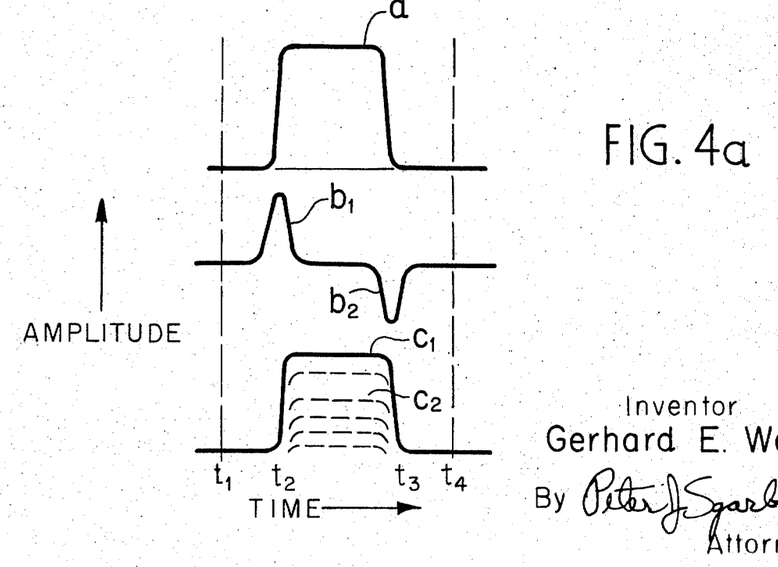
FIG. 4a is a graphical representation of addressing signals used for readout in the FIG. 4 system of the resulting information signals.

Apart from cross talk arising due to undesired current paths in the matrix which is minimized because of the inclusion of a diode in the construction of the sensors as discussed in connection with FIG. 3c, one has also to consider undesired signals arising due to the stray capacitance of the columns and rows. When the readout voltage $V_o$ is switched on, the capacity of these elements is charged up and produces a spurious output voltage unrelated to the modulated resistance and thus the elemental detected intensity level of the sensor element which is to be read. In order to distinguish this non-useful capacitive current from the useful resistive signal current, the voltage source 45 is made to have certain special characteristics. First, it is a pulsed source, synchronized to the switching pulses actuating the switching transistors 43 and 44. FIG. 4a illustrates one pulse in the output of source 45 with curve a, which plots amplitude vs time. Secondly, this read-out pulse is of slightly shorter duration than the element "on" time, which begins at time $t_1$, with the read-out pulse beginning at $t_2$ and ending at $t_3$, the element finally being disconnected at $t_4$. Thus we see that the read-out pulse duration $t_2 - t_3$ is of a slightly shorter duration than the element "ON" time $t_1 - t_4$ and is synchronized so that it is on only after the column and row of the sensor element being read have been connected by the switching transistors, and so that it is removed before the column and row are disconnected by their switching transistors. Thirdly, the pulsed source presents a constant and low impedance output to the matrix so that the stray-capacitance voltages, illustrated by curves $b_1$ and $b_2$, discharge through the generator 45 at $t_3$ after the readout pulse is removed. Simple known electronic means may then be used to filter out the capacitive signal from the useful resistive signal, which appears across resistor 46.

If the elemental image intensity sensed by the portion of photocathode 11 associated with the addressed sensor element is low, few electrons are directed upon that sensor by the multichannel plate 12 and its resistivity will be nearly unmodulated and quite low, resulting in a video output signal pulse of relatively high amplitude, such as curve $c_1$. On the other hand, if the element senses a higher light intensity, the resistance to the readout pulse will increase to a larger accumulation of charge on the dielectric layer 32 of the element, resulting in a smaller amplitude video output signal pulse such as curve $c_2$. As the switching transistors are systematically scanned a train of such pulses of varying amplitude are produced at the output terminal S constituting the video output signal $V_s$ representative of the image information detected by the device of FIG. 1. When such pulses are directed to a video reproducer with a systematic scan corresponding to that of the read-out system, the detected image will be displayed in a high resolution, high-gain form.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A device for detecting image information comprising: a cathode layer responsive to said image information to emit electrons, said electron emission having an intensity distribution over said layer representative of said image information;

a channel multiplier plate disposed in spaced relationship to said cathode layer and accepting said electron emission distribution for amplification and transmission;

and an array of field-effect elements disposed in spaced relationship to said plate and having a layer receiving said amplified electron distribution from said plate, said array layer establishing a corresponding charge distribution pattern in response to said electron emission, said charge pattern exerting an electric field of locally varying strength over said array, said elements having respective conductivities individually varying in accordance with said locally varying electric field strength and thereby in a manner representative of said image information.

2. A device as in claim 1 in which said cathode layer is a photoemissive one directly sensing optical image information.

3. A device as in claim 1 in which said array layer is a leaky dielectric layer storing said corresponding charge distribution for a predetermined time period.

4. A device as in claim 3 in which said array is a row-and-column array of field effect semiconductor elements, with each of said field effect elements having a drain and a source, and wherein said array includes a set of row electrodes and a set of column electrodes, said element drains being connected to one set and said element sources connected to the other set.

5. A device as in claim 3 in which said array of field-effect elements further include on the side of said array layer opposite said plate a substrate of supportive and insulating material and a sensor layer sandwiched between said dielectric layer and said substrate, said sensor layer comprising:

a first plurality of electrodes fixed to said substrate and spaced in an array of parallel columns;

an insulator layer fixed over said column array and having uniform openings at regular spaced intervals across its surface in registration with each of said columns to expose portions of said electrodes, said openings being formed in rows transverse to said columns and parallel to each other;

a second plurality of electrodes fixed to said insulator layer and spaced in an array of rows parallel to and alternating with said rows of openings so that each of said openings is between two of said row electrodes;

a layer of semiconductor material fixed over and in electrical contact with said second plurality of electrodes and said insulator layer, said layer being depressed at each of said insulator openings and electrically contacting therethrough each of said exposed portions of said first plurality of electrodes, said layer providing a pair of semiconductive paths between each of said exposed portions of said column electrodes and adjacent portions of the row electrodes between which each of said openings is situated, each of said semiconductive paths varying in conductivity in response to the electric field exerted by the local charge present on said dielectric layer.

6. An array of field-effect-type elements for reproducing a charge distribution pattern, comprising:

a substrate layer of supportive and insulating material;

a first plurality of electrodes fixed to said substrate and spaced in an array of parallel columns;

an insulator layer fixed over said column array and having uniform openings at regular spaced intervals across its surface in registration with each of said columns to expose portions of said electrodes, said openings being formed in rows transverse to said columns and parallel to each other;

a second plurality of electrodes fixed to said insulator layer and spaced in an array of rows parallel to and alternating with said rows of openings so that each of said openings is between two of said row electrodes;

a layer of semiconductor material fixed over and in electrical contact with said second plurality of electrodes and said insulator layer, said layer being depressed at each of said insulator openings and electrically contacting therethrough each of said exposed portions of said first plurality of electrodes, said layer providing a pair of semiconductive paths between each of said exposed portions of said column electrodes and adjacent portions of the two row electrodes between which each of said openings is situated;

and a uniform layer of leaky dielectric fixed over said semiconductor material and storing for a predetermined time a pattern of applied electrical charge, the conductivity of each of said semiconductive paths independently varying in accordance with the local field strength of that local portion of the charge distribution situated over the particular path.

7. A system for detecting and reading out image information comprising:

a cathode layer responsive to said aid image information to emit electrons, said electron emission having an intensity distribution over said layer representative of said image information;

a channel multiplier plate disposed in spaced relationship to said cathode layer and accepting said electron emission distribution for amplification and transmission;

an array of field-effect elements disposed in spaced relationship to said plate, said array including a layer of dielectric receiving said amplified electron distribution from said plate for establishing a corresponding charge distribution over said layer in response to said emission distribution, and a row- and-column array of semiconductor elements adjacent said dielectric layer on the side of said layer opposite said plate, each of said elements having a drain and a source, said semiconductor array including a set of row electrodes and a set of column electrodes, said element drains being connected to one set and said element sources connected to the other set, with one of said sets of connections being rectifying in nature, the conductivity of each of said elements individually varying in accordance with the field due to the local charge on the portion of said dielectric layer adjacent said element;

and means connected to each of said column and each of said row electrodes for sensing the individual conductivities of said field-effect elements and for reproducing an electrical output modulated in accordance with said element conductivities to reconstitute in signal form said image information.

* * * * *